US010453179B1

United States Patent
Karppanen et al.

(10) Patent No.: US 10,453,179 B1
(45) Date of Patent: Oct. 22, 2019

(54) SCALED IMAGE GENERATION

(71) Applicant: Amazon Technologies, Inc., Reno, NV (US)

(72) Inventors: Jari Juhani Karppanen, Bellevue, WA (US); Kartikey Bhatt, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 296 days.

(21) Appl. No.: 15/274,248

(22) Filed: Sep. 23, 2016

(51) Int. Cl.
| | |
|---|---|
| *G06T 3/40* | (2006.01) |
| *H04N 19/34* | (2014.01) |
| *G06T 5/00* | (2006.01) |
| *G06T 5/20* | (2006.01) |
| *G06T 5/50* | (2006.01) |
| *H04N 19/86* | (2014.01) |
| *H04N 19/635* | (2014.01) |

(52) U.S. Cl.
CPC ............ *G06T 3/4092* (2013.01); *G06T 5/002* (2013.01); *G06T 5/20* (2013.01); *G06T 5/50* (2013.01); *H04N 19/34* (2014.11); *H04N 19/635* (2014.11); *H04N 19/86* (2014.11)

(58) Field of Classification Search
None
See application file for complete search history.

(56) References Cited

U.S. PATENT DOCUMENTS

| | | | | |
|---|---|---|---|---|
| 7,580,577 B2 * | 8/2009 | Enokida | ................. | G06T 9/007 382/232 |
| 7,830,800 B1 * | 11/2010 | Masterson | ....... | H04N 21/64738 370/232 |
| 8,102,916 B1 * | 1/2012 | Masterson | ............. | H04N 19/61 375/240.16 |
| 2016/0112703 A1 * | 4/2016 | Hafey | ................... | H04N 19/33 382/232 |

OTHER PUBLICATIONS

Deshpande, S.—"HTTP Streaming of JPEG2000 Images"—IEEE 2001, pp. 15-19 (Year: 2001).*
Antonini et al., "Image Coding Using Wavelet Transform", IEEE, Apr. 1992 (16 pages).

* cited by examiner

*Primary Examiner* — Bernard Krasnic
(74) *Attorney, Agent, or Firm* — Hogan Lovells US LLP

(57) ABSTRACT

A higher quality image can be presented in response to a resize action by using the resized image as a starting point for a progressive encoding scheme. A system that provided the image content can resize a copy of the original image in order to have a copy of the resized image. The system can encode a new image of the target size using a wavelet encoding algorithm, and can compare the resized version to one or more of the intermediate decoded versions produced by the encoding scheme. Upon finding a similar intermediate version, the server can provide the remaining transformation passes to be applied to the resized version previously provided. A correction pass can also be executed that applies a filter or post-processing algorithm to reduce the delta between desired output and the output from the transformation.

20 Claims, 9 Drawing Sheets

SCALED IMAGE GENERATION

BACKGROUND

As the capabilities of various computing devices expand, users are increasingly utilizing these devices to perform a variety of tasks. For instance, users are increasingly viewing digital content on devices such as smart phones and tablet computers. Due to the relatively small sizes of some of these devices, a user may not be able to determine the desired content or detail from the images displayed. In many instances a user will adjust a viewing size of the image content, such as by zooming in on a specific portion of an image, map, or page. Simply resizing the current image may not be adequate, as the resized image may show pixilation, blurriness, or other artifacts from the resizing, and does not provide additional detail. Accordingly, many conventional approaches send an updated image or image tile of the appropriate size that includes a higher level of detail or resolution than would be contained in a resized version of the current image. This can result in a significant amount of bandwidth being utilized to transmit the various versions, which can be particularly undesirable for portable devices that have limited data plans. Further, additional resources are needed to store or cache the various versions on the server as well as the displaying device.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to providing and/or displaying content using an electronic device. In particular, various embodiments can enable a client device to display a higher quality image upon a zoom or resize action than would be possible using the resized image alone. The improvement can be provided using less data than would be required to send a new image of the target size corresponding to the resize action. A server can resize a copy of the original image in order to have a copy of the resized image matching what is available on the client device. This blurry, resized image can be considered as a low bandwidth version of the correct image, similar to an intermediate step in a wavelet encoding scheme. For example, as a wavelet encoding scheme is utilized to progressively render a particular image from a low-quality version of the image to a high-quality version of the image, intermediate versions in the process are of the particular image are of a quality between the initial and final versions. According to an embodiment, the server can first encode a new version of the image that is being displayed on the electronic device, the new version of the image being of the target size desired on the device after a resizing operation, for example by using a wavelet encoding algorithm, and can compare the resized version of the image on the client device to one or more of the intermediate encoded versions of the original image that were produced by the encoding scheme. Upon finding a similar intermediate version, the server can provide the remaining transformation passes to the client device to be applied to the resized version already stored by the client device. Since the encoding passes applied to the resized image will not correspond to the actual wavelet encoded output, the resulting image on the client device may exhibit various artifacts. Accordingly, a correction pass can occur on the client device that applies a filter (e.g. a sharpening or "de-ringing" process) to reduce the delta between desired output and the output from applying encoding to the resized image already on the client device.

Various other applications, processes and uses are presented below with respect to the various embodiments.

Figure 1A:
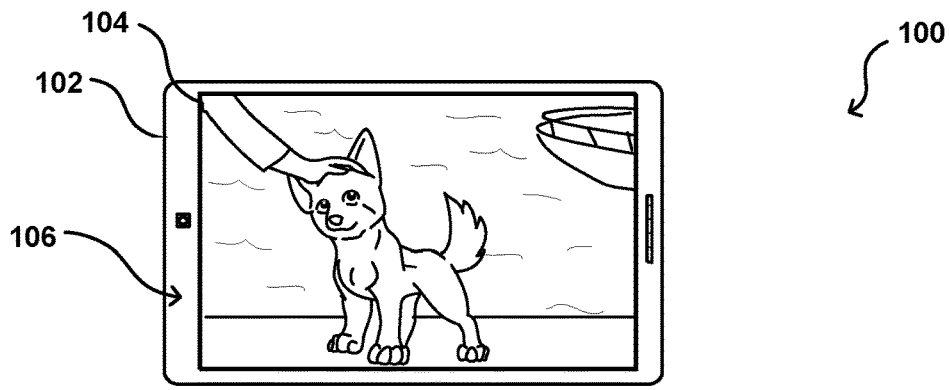
FIGS. 1A, 1B, and 1C illustrate an example approach to resizing an image that can be performed in accordance with various embodiments.
Figure 1B:
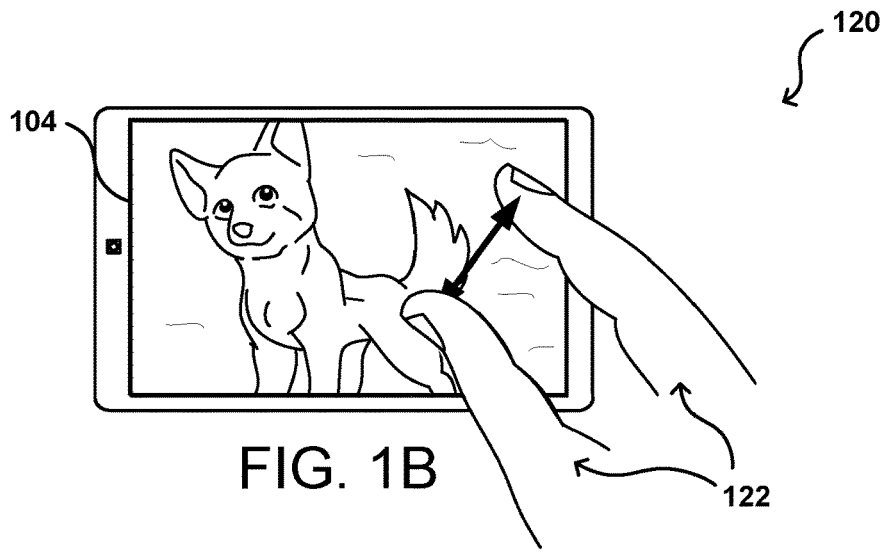

FIG. 1A illustrates an example display 100 wherein image content, such as a still image, image tile, or frame of video content, is displayed on a display screen 104 of a computing device 102. The image content 106 can be a standalone image (e.g., a .jpg, .png, or .gif image) of an item of interest, one or more map tiles, or a web content tile (e.g., a texture or bitmap), among other such options. It might be the case that a user viewing the image content 106 wants to obtain a more detailed view of a portion of the image, or otherwise wants a closer view of an object represented in the image content 106. Accordingly, as illustrated in the example display 120 of FIG. 1B, a user can perform an action to cause the device 102 to "zoom" in on the object represented in the image content. In this example, the user is using two fingers 122 to contact a touch-sensitive display and make a zoom motion by separating a distance between the fingertips contacting the display, although many other approaches for adjusting a zoom level of displayed content can be used as well as would be apparent to one of ordinary skill in the art in light of the teachings and suggestions contained herein. In this example the zoom action has the effect of increasing an effective size of the image, such as by going from a 100×100 pixel image to a 150×150 pixel image. If the resized image is larger than the resolution or size of the display, or near an edge of the display, then only a portion of the resized image might be displayed.

Figure 1C:
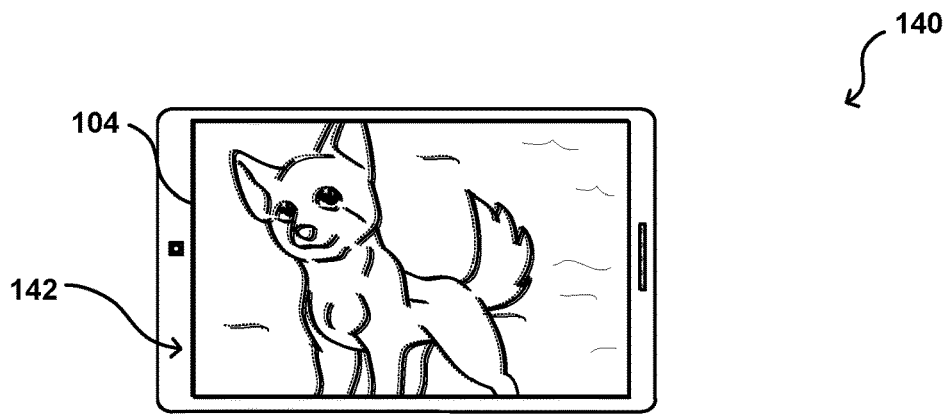

Using a conventional zoom or resize approach, however, the existing set of pixel values is used to generate the larger image, without any additional data or detail being provided. As illustrated in the example display 140 of FIG. 1C, the image content 142 upon resizing can include various low resolution defects, such as pixilation or blurriness where data from a smaller number of pixels was used to color a larger number of pixels. As known for resizing, this can result in a lack of resolution or sharpness of the resized image. For at least some implementations it may be desirable to improve the appearance of the image content upon a zoom or other resizing action.

Figure 2A:
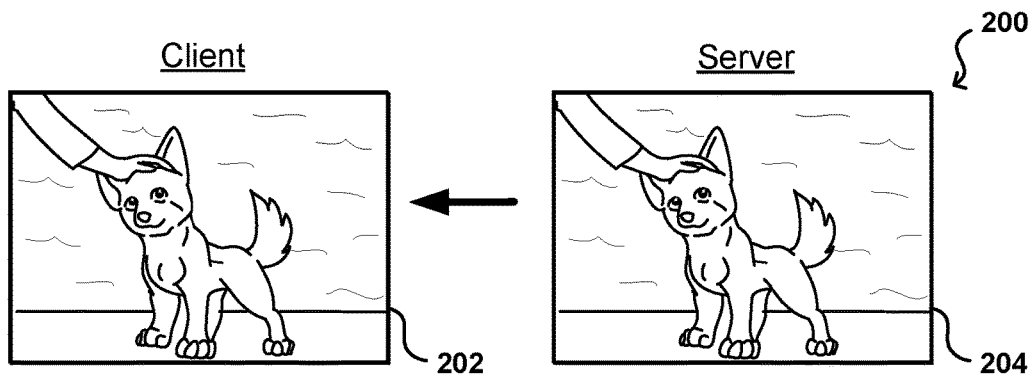
FIGS. 2A, 2B, and 2C illustrate an example approach enabling a user to adjust a magnification of displayed video in accordance with various embodiments.
Figure 2B:
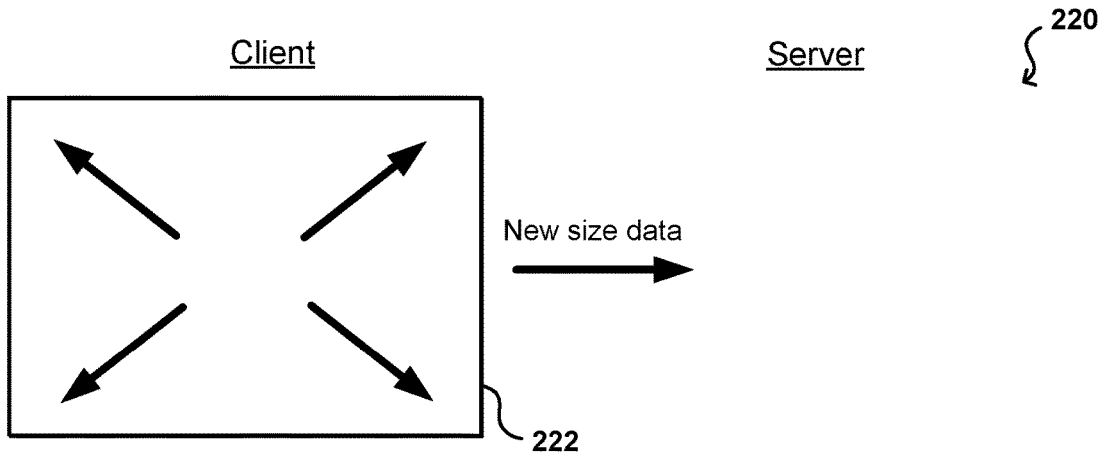
Figure 2C:
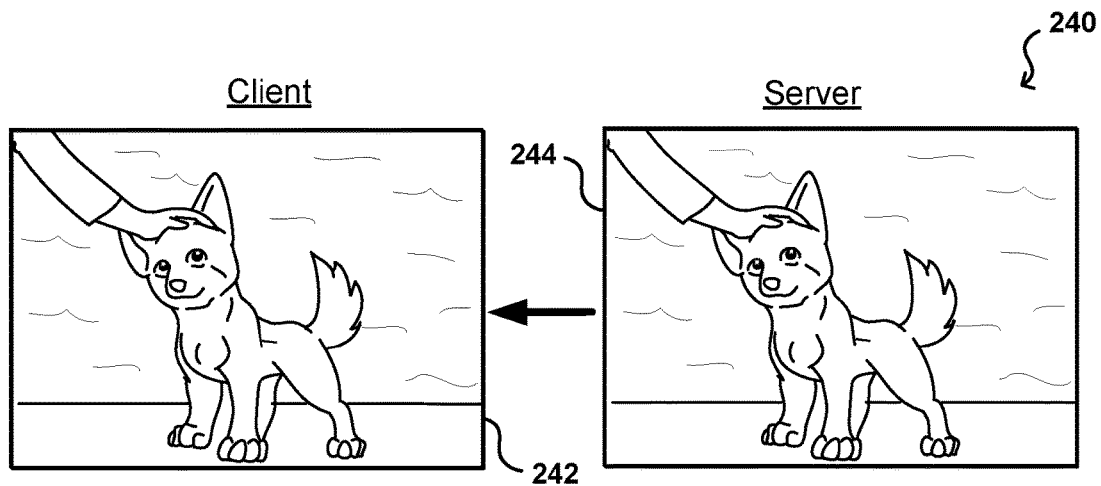

One approach that can be used involves sending new image content in response to the action. As illustrated in the example situation 200 of FIG. 2A, a client device (or other electronic device) can receive image content 202 from a server (or other such source) having access to a local copy 204 of the image. The image 202 received to the client device can be sized to a default size or a size specified by a browser or other application executing on the client device, among other such options. At some point subsequent to the initial providing, a resize action 222 can be performed with respect to the client device as illustrated in FIG. 2B. In response, an application or process executing on the client device can cause a request to be sent to the server 220 for image content corresponding to the resize action. In at least some embodiments, the request can specify parameters or other information resulting from the resize action, such as a new image or canvas size, pixel size, pixel density, resolution, or other such data. In response, the server can locate or generate a version 244 of the image having the appropriate size. This can be performed in some embodiments by taking a large, high resolution version of the image and creating a smaller version corresponding to the requested image size. A copy 242 of the image can then be sent to the client device for display according to the determined resize action, as illustrated in the example situation 240 of FIG. 2C. The copy with the larger size will have better detail and appearance than would have been the case if the client device had instead used the original image copy 202 from FIG. 2A and resized according to the resize action.

Such approaches are not optimal in all situations, however, as these approaches require full versions of each image size to be transmitted to the client device. As mentioned, this can require significant additional bandwidth, which can be undesirable for many users, particularly those using devices with limited data plans or those who pay based on the amount of data transmitted. Further, the need to store multiple full versions of images can take up significant memory and other resources on the client device, which can be problematic for devices with limited memory and other such resources.

Accordingly, approaches in accordance with various embodiments attempt to can take advantage of the fact that a version of the image data is already present on the client device, or other such system or component, in order to reduce the amount of data that is to be transmitted and provide a higher quality version of a resized image. This process can be performed automatically for all images, upon request from a user or device, or when the resizing will lead to a noticeable degradation in image quality, among other such options.

Figure 3A:
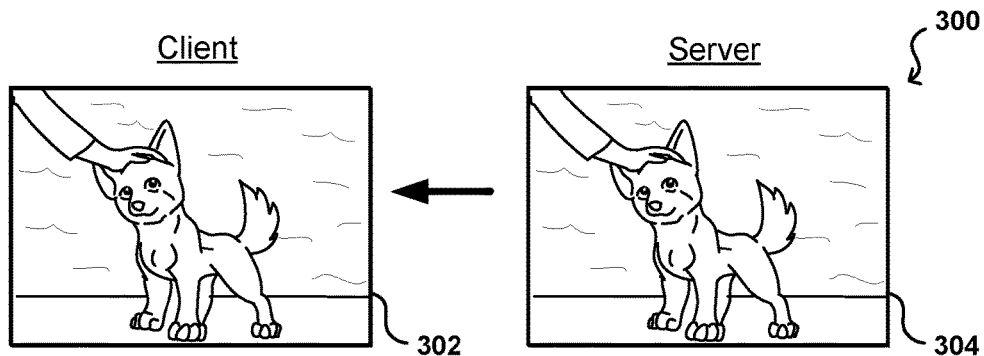
FIGS. 3A, 3B, and 3C illustrate a first part of an example approach for providing a resized image that can be utilized in accordance with various embodiments.
Figure 3B:
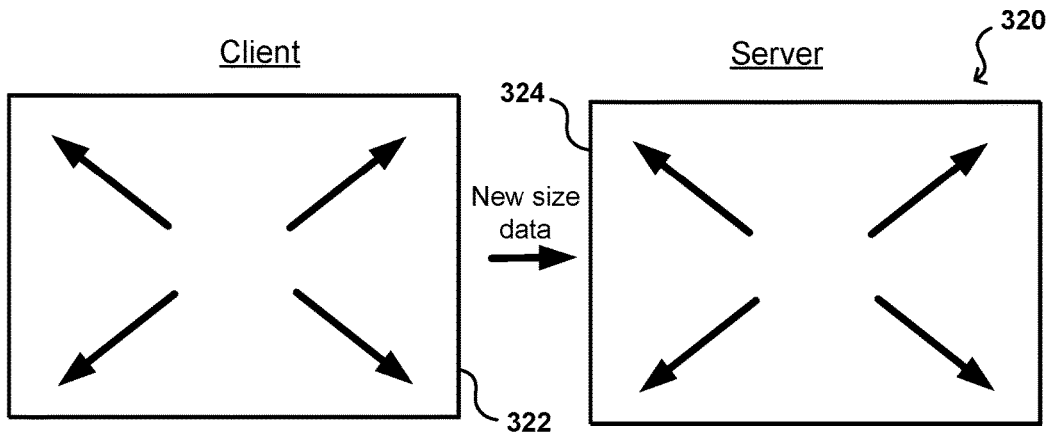
Figure 3C:
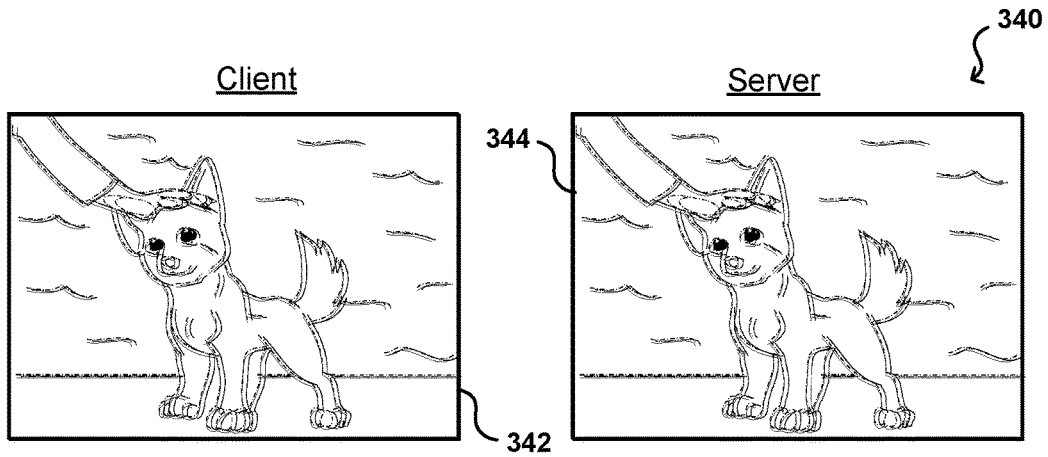

FIGS. 3A to 3C illustrate a first portion of an example process that can be utilized in accordance with various embodiments. In the situation 300 of FIG. 3A, a server or other system or service of a content provider can provide a copy 302 of an image to a client device, where the server has an accessible copy 304 available. The copy 302 can be sent in response to any appropriate action, such as a request for content from the client device or a pushing of content to the device. The image can be a standalone image, an image tile generated for a specific application or page, part of a larger image or video file, or other such image content, such as internet content or webpages. The copy 302 can be of a specific size, as may be specified by a client request or application, and the server-accessible copy 304 may be of the same size or may be a higher resolution or larger version, among other such options. In some embodiments the server may generate the copy 304 of the appropriate size using a larger or higher resolution image, or generating the image from vector or other data, etc. The server can also keep track of the size of the image that was sent, at least during a current session.

During a display of image content on the client device, a resize action may occur as illustrated in the example situation 320 of FIG. 3B. This may occur due to any of a number of different actions as discussed elsewhere herein, which may be triggered by a user, application, device, sensor, or other such actor. In this example, the resizing action can result in the image being resized to an image of a corresponding size 322. Approaches for determining the size of an image in response to a resizing action are well known in the art and, as such, will not be discussed herein in detail. The resizing action can also cause a request or call to be sent to the server indicating at least the new size or extent of the resizing action. In some embodiments the request can also specify the size of the copy 302 of the image before the resizing action or as originally provided, among other such options.

As mentioned, it is desirable in this example to reduce the amount of image data that needs to be transmitted to the client device. Accordingly, the server can attempt to take advantage of the image content that is already available on, or to, the client device. Accordingly the server can determine the size of the image 324 that is to be provided in response to the resize action, as well as the size of the image 304 that was provided initially. The server can then use the copy 304 for the original size, or regenerate the local copy, in order to have a version of the image that is similar to the copy 302 stored by the client. The server can resize that image to generate a resized version 344 of the image that will be equivalent to the resized version 342 generated by the client using its local copy 302 as illustrated in the example situation 340 of FIG. 3C. The version 344 generated by the server can then be used as a starting point for generating a higher resolution version of the appropriate size that can be provided to the client device. As mentioned, in some embodiments there may be a minimum threshold below which such actions are not taken. For example, if a 100×100 pixel image is resized to 101×101 pixels, then any artifacts resulting from the resizing may not be noticeable enough to warrant the resources used to improve the resized version. Thus, a minimum resizing threshold of 5% or 10% in any dimension or overall size can be used to determine whether or not to trigger an action and send a request to the server. In some embodiments a request or call may always be sent to the server for a resize or other such action, and the server can determine whether to take action or whether or at least track the current state of the content on the client device.

Figure 4:
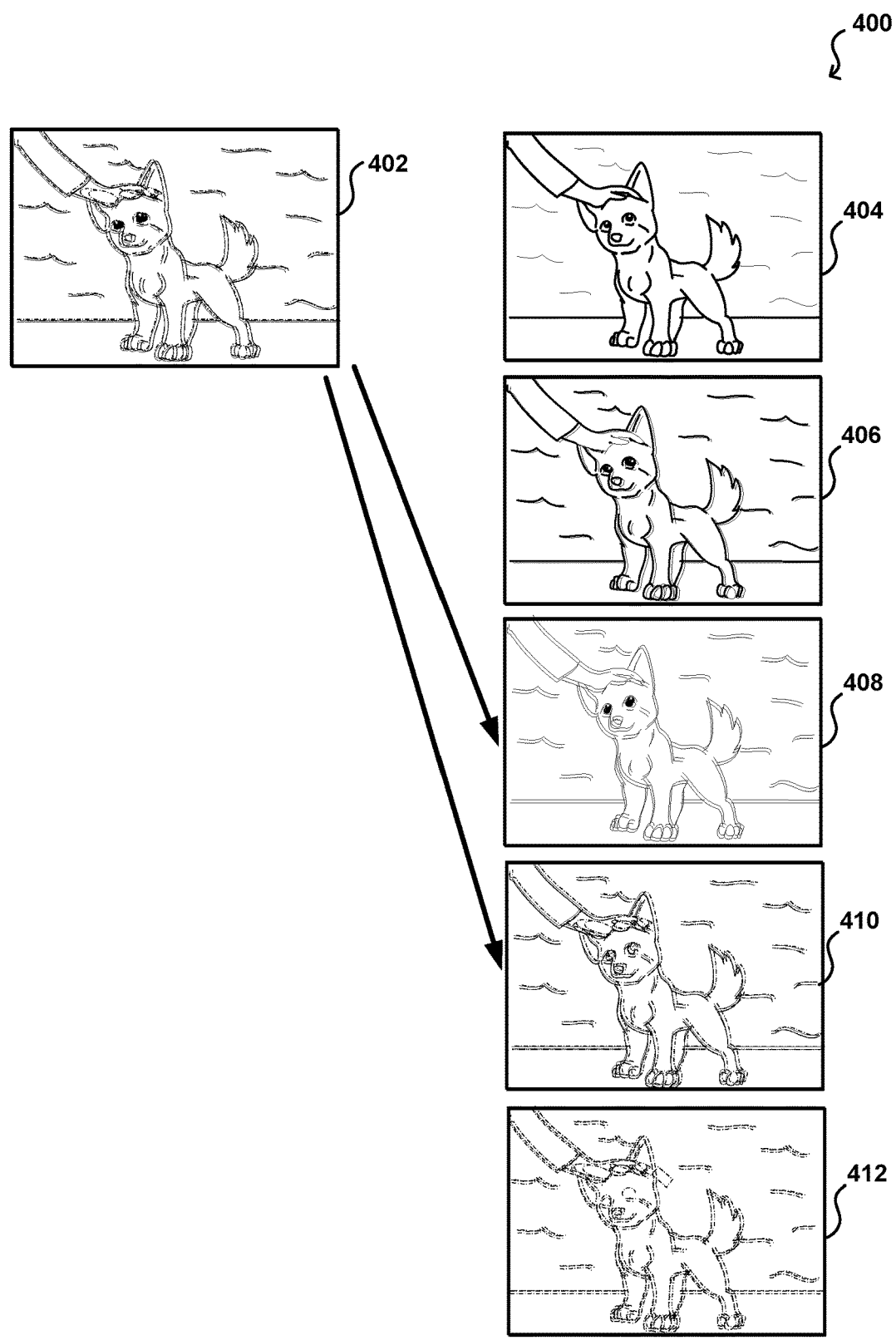
FIG. 4 illustrates a second part of an example approach for providing a resized image that can be utilized in accordance with various embodiments.

The resized version on the server should contain the same artifacts (e.g., blurriness or pixilation) as the resized version on the client device. Accordingly, the server can use this resized version as a starting point to generate a higher quality image of the target size without having to send a completely new image. In at least some embodiments, the server can take advantage of the fact that certain images are generated using a series of versions starting from a low quality version through one or more intermediate versions to a high quality version. These versions can be generated through, for example, a wavelet encoding scheme that generates a progressive encoding of images. FIG. 4 illustrates an example set 400 of image versions where the initial resized image 402 is used along with a high quality version 404 of the appropriate size. As mentioned, the server can encode the new image 404 or image tile using, for example, a wavelet encoding algorithm. The wavelet encoding algorithm will generate an initial decoded image version 412 and one or more intermediate decoded versions 406, 408, 410 as illustrated in FIG. 4. As known for such an encoding algorithm, the intermediate versions 406, 408, 410 build from the initial version 412, and the final version 404 builds from the last intermediate version 406.

In order to generate the final version 404 without sending an entirely new image, the server can use the resized version 402 of the image stored on the client device in place of one or more of the initial version 412 and/or intermediate versions 406, 408, 410 of the encoded image. The resized version 402 can be compared against at least the intermediate decoded versions 406, 408, 410 to determine which of the decoded versions is most similar to the resized version. This can involve, for example, calculating deltas between the resized version and the various decoded versions, among other such options. The closest decoded version can depend upon a number of different factors, such as the encoding scheme used or the amount by which the client copy was resized. The server can attempt to find the closest matching decoded version and then "substitute" the resized version for that intermediate decoded version in the encoded image data. The matching process can look at any appropriate matching criteria, such as pixel by pixel delta values, average delta values, sharpness values, and the like. In some embodiments the process will find the two closest decoded versions, if the versions satisfy at least one similarity criterion or threshold, and select one of the decoded versions based on one or more rules or policies. For example, the process might prefer to emphasize sharpness and would select the decoded version based on the relative sharpness. In some embodiments the delta values will be examined to attempt to detect the presence of false colors, which can be more noticeable to the human eye than slight blurriness. This can include, for example, looking at the delta values for various color channels to attempt to determine if one of the channels has a much larger delta value than the others. Thus, an intermediate image resulting in false colors would be rejected over an intermediate image that would produce slightly more blurriness in the final image. Various other selection criteria can be used as well within the scope of the various embodiments.

Figure 5:
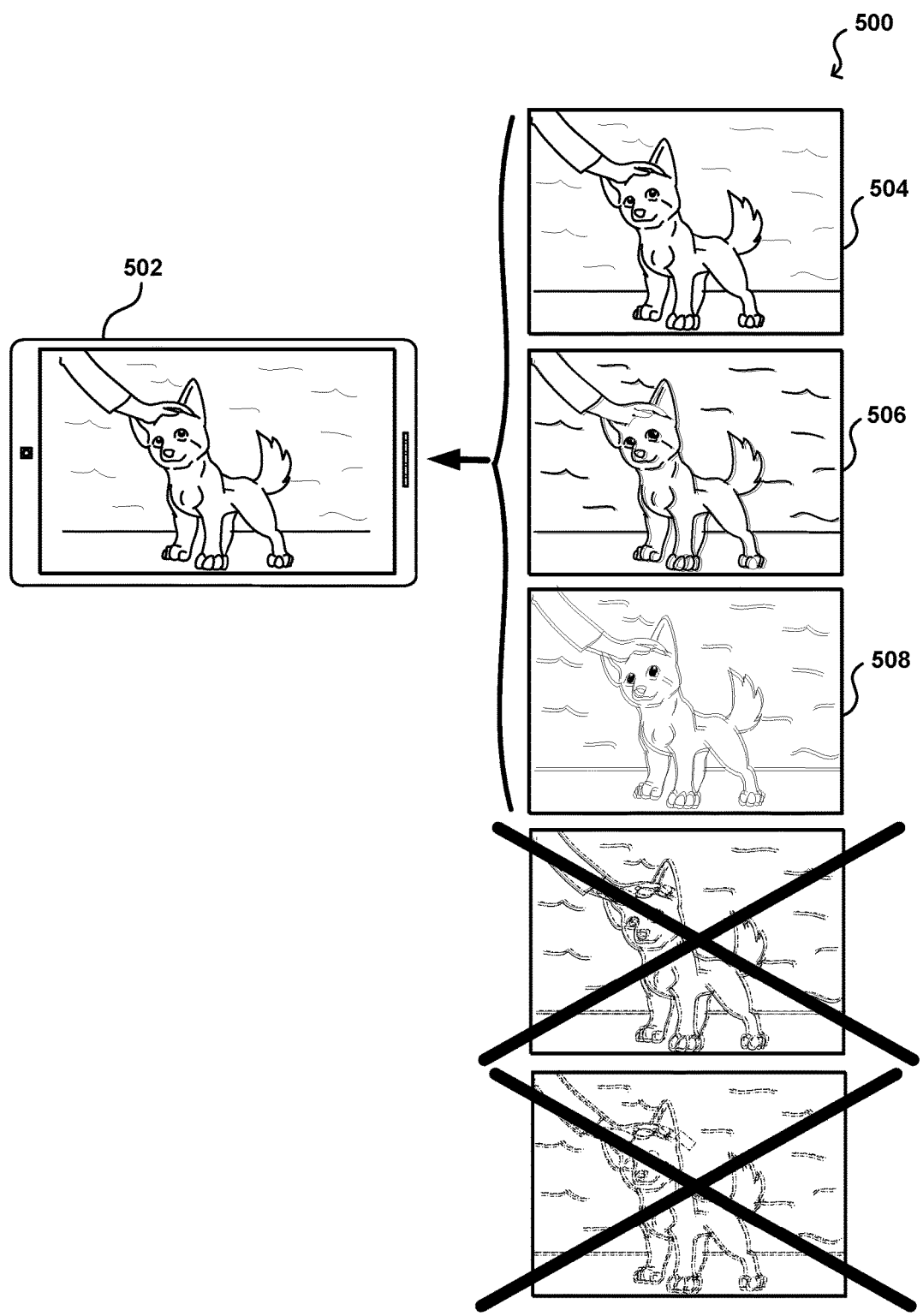
FIG. 5 illustrates a third part of an example approach for providing a resized image that can be utilized in accordance with various embodiments.

Once a decoded version is selected according to the selection and/or similarity criteria, the initial and/or intermediate decoded versions that come "before" that decoded version in the encoded image can be discarded. The resized version can be then logically substituted for the selected version, and the encoding information (i.e., data for the subsequent transportation passes) for the subsequent intermediate and final image versions can be selected for transmission to the client. In the example situation 500 of FIG. 5, the initial decoded version and first intermediate decoded version are removed from consideration as the first intermediate decoded version was determined to be substituted by the resized image. Accordingly, the encoding information to be sent to the client device does not need to include an initial image version, but can include only the encoding information used to generate the final two intermediate versions 506, 508 and the final version 504. This information can be sent to the client device, which can use the resized version of the initial copy and apply the encoding data to the resized version, in order to generate a final image 502 of the desired size that is similar in appearance to an image of that size that would have been sent if a completely new image was to be provided. The amount of data is then significantly less than would need to be provided for a full new image, as the initial image version and at least one encoding layer of data does not need to be sent to the device. The remaining encoding information can instead be applied with the resized version on the client being treated as one of the intermediate versions.

Because, however, the resized image on the client device was not exactly the same in most cases as one of the intermediate decoded versions, the application of the remaining encoding data will result in an image that is not exactly the same as the full high quality version that would otherwise have been provided. Applying the encoding to a different version may result in artifacts in the final image such as some amount of over-sharpening, blurriness, pixilation, and the like. The artifacts can be significantly less than were present in the resized image alone, however, such that the process could stop here and still result in a noticeable improvement in many cases. In this example, however, an amount of post-processing can be performed in order to further improve the results.

Figure 6:
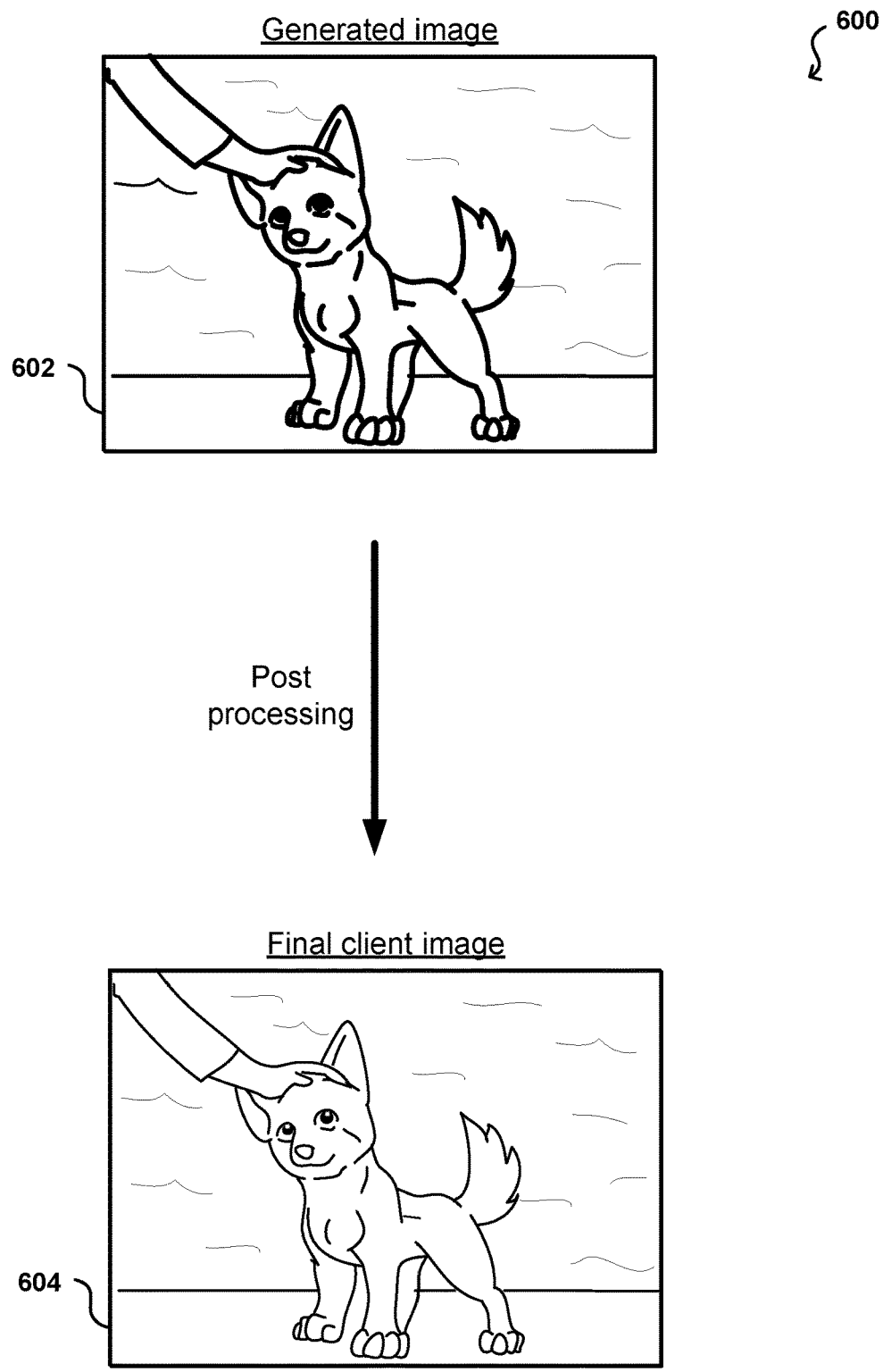
FIG. 6 illustrates an example approach to adjusting artifacts created during an image generation process that can be utilized in accordance with various embodiments.

As an example, FIG. 6 illustrates an example situation 600 wherein a version 602 of the image has been generated for the new size using the original resized version as a starting point. As illustrated, there are some over-sharpening and edge effects present that may not be desirable from at least an aesthetic point of view. Accordingly, the client device in at least some embodiments can perform some level of post-processing to attempt to generate a final version 604 on the client that has fewer visible artifacts. In some embodiments the client might perform a default set of processing, or might analyze the image to determine which type of post-processing to apply. These can include filtering options such as sharpening or de-ringing processes, among other such options. Other examples include text sub-pixel sharpening algorithms, to improve the appearance of text in an image, as well as tile edge filters, in order to attempt to remove artifacts resulting from adjacent tiles coming together in the display. In other embodiments the server might compare the result of the process with the high quality version to determine the types or extent of artifacts present, and determine the appropriate post-processing to apply. The server can then provide this information with the encoding data for use by the client device. Third party services or software can also be used to adjust the images, among other such options. The resulting image should then be relatively similar to what would have been obtained if a full image had been received, and substantially better than the original resized version, while requiring less bandwidth and fewer resources for the client device to obtain.

Figure 7:
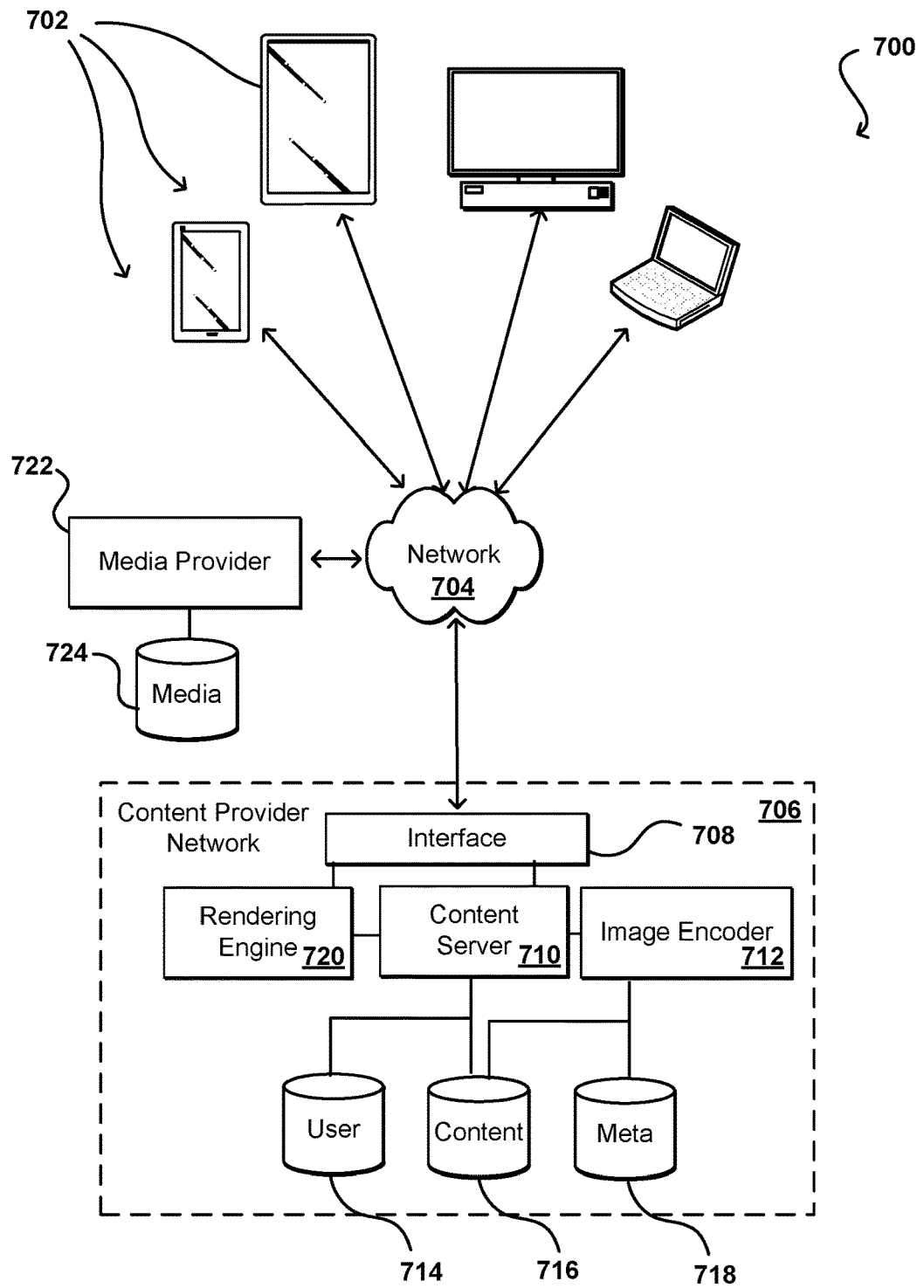
FIG. 7 illustrates an example environment that can be used to implement aspects of the various embodiments.

FIG. 7 illustrates an example environment 700 in which aspects of various embodiments can be implemented. In this example, users are able to utilize various types of electronic devices 702 to request delivery of content over at least one network 704, such as the Internet, a cellular network, a local area network, and the like. As known for such purposes, a user can utilize a client device to request image content, alone or as part of an offering of content, and in response the image content can be downloaded, transmitted, or otherwise transferred to the device. In this example, the users can have an account with a content service provider associated with a content provider network 706. At least some embodiments operate using a client pull model, wherein a client device asks for information about what is available for download, and the client determines which content to download and requests that information. As discussed elsewhere herein, the client device can request only those tiles, slices, or streams as are appropriate for changes in magnification or other such aspects, and minimizes the amount of bandwidth, memory, and processing capacity needed for portions of the content that are not actually displayed on the device.

A request for content can be received to an interface layer 708 of the content provider network 706, which can include components such as APIs, Web servers, network routers, and the like. The components can cause information for the request to be directed to a content server 710, or other such component, which can analyze information for the request to determine whether to provide the content identified in the request. In some embodiments this can include validating a user credential to verify that the user has a current account that enables access to the requested content in the manner requested. This can involve, for example, comparing the credential against information stored for the user in a user data store 714 or other such location. If the user has such an account, the user can be provided with access to the content, which can include initiating a transfer of the content to the appropriate user device in at least some embodiments. In some cases, the content provider can provide the content directly, such as from a content data store 716 of the provider network 706. In other cases the content provider might send a request to a media provider 722, which might be a producer of the content or another such entity, system, or service, which can cause the content to be transferred from a respective media repository 724. Various other approaches to enabling content to be provided for display on various client devices can be utilized as well in accordance with various embodiments. In at least some embodiments, the content server 710 or a related content manager can also determine which version of the content to provide, as different sizes, resolutions, or versions can be appropriate for different types of devices based on factors such as operating system, application type, display resolution, connection bandwidth, type of user or subscription, and the like.

In some embodiments, the content repository 716 will include one or more high quality, high resolution versions of each image to be provided. These versions may or may not include the original high quality version(s) obtained for the represented content. The images can include discrete images or tiles used to generate map views or application pages, among other such options. When a specific image size is to be utilized, the content server 710 can cause an image of that size to be generated using the larger, high quality version, and that image can then be provided to the corresponding client device 702. As mentioned, in some instances a resize or other such action will occur with respect to one of the client devices 702, which can cause a call or request to be submitted to the content provider network 706. As mentioned, there can be various criteria utilized to determine when such an action results in a call or request for content in at least some embodiments. The request in at least some embodiments can specify the new size resulting from the resizing action, and in some embodiments can include additional information as well, such as identifiers for the affected image content, view window coordinates, sizes of the images previously provided, and the like. The content server 710 or a content manager can work with an image encoder 712 to generate the encoding data needed to generate an image of the target size using the image data already stored by the client device. As mentioned, this can include specifying the image, prior size, and target size, and causing the image encoder 712 to resize the image from the prior size to the target size and determine encoding information to build from the resized image. The encoding data can effectively function as a delta between the values of the resized version and the values of the target version. In some embodiments the image encoder can utilize various metadata or other information stored in an appropriate data store to determine the appropriate encoding parameters or criteria. The image encoder can also have access to the content repository 716 in order to locate the image content of interest. Once the new image is provided, information for the image can be stored to the metadata repository 718 or another appropriate location. In at least some embodiments the content server 710 can work with a server-side rendering engine 720 that can perform the rendering and send the resulting instructions to the appropriate client device 702, as may be useful for rendering, post-processing, tile edge artifact determination, and the like.

Figure 8:
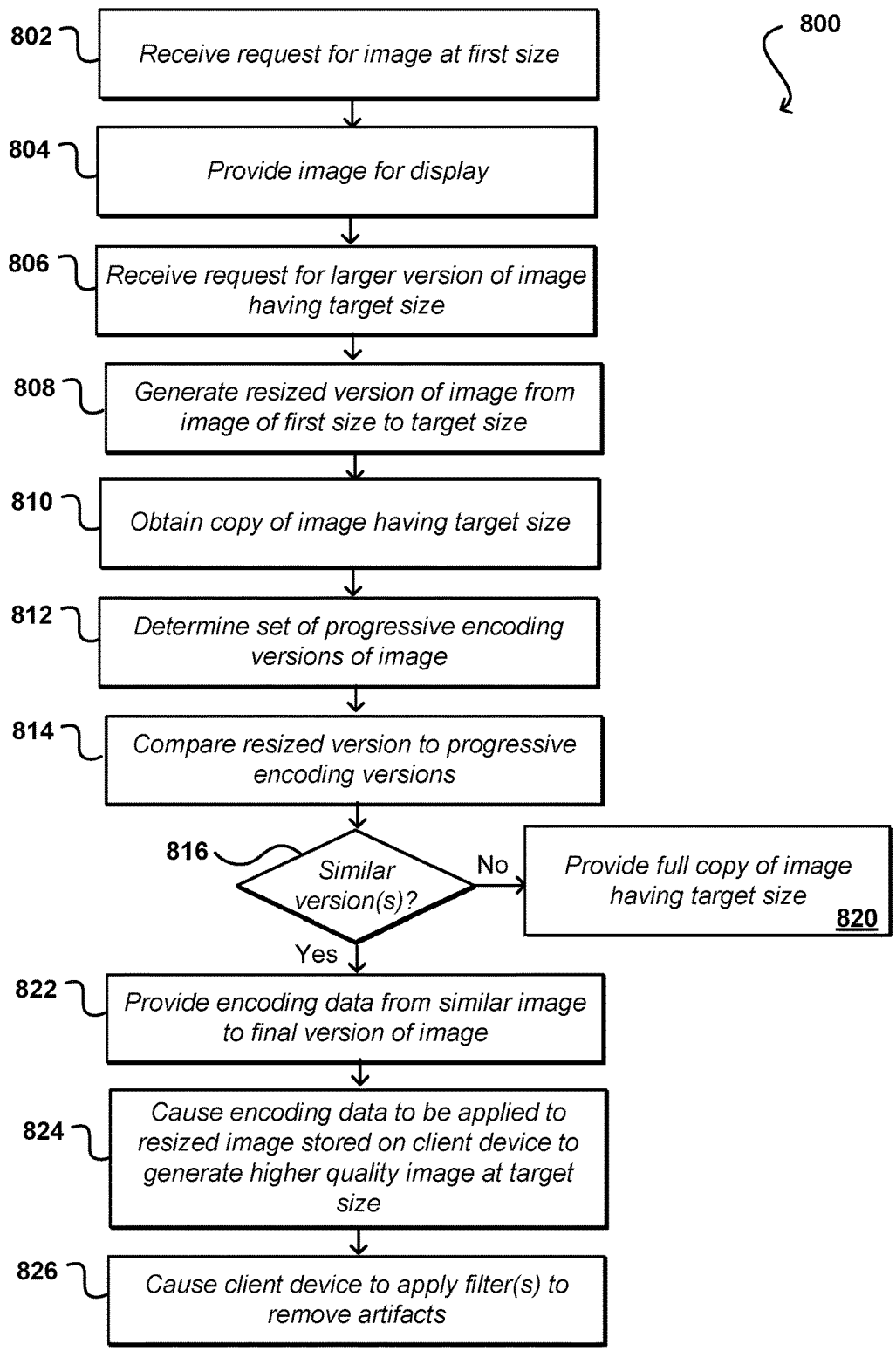
FIG. 8 illustrates an example process for generating a resized image that can be utilized in accordance with various embodiments.

FIG. 8 illustrates an example process 800 for improving a display of resized image content that can be utilized in accordance with various embodiments. It should be understood that, for any process discussed herein, there can be additional, fewer, or alternative steps performed in similar or alternative orders, or in parallel, within the scope of the various embodiments unless otherwise stated. In this example, a request is received 802 for image content at a first size. The request can be received from an application executing on a client device, for example, where the size can be dependent at least in part upon a view, magnification, or zoom setting on the client device. In response, the image content can be located and, if necessary, a version of the appropriate size generated. The image content can then be provided 804 for display or presentation via the requesting client device.

Subsequently, a second request can be received 806 for a larger version of the image that is of a target size. As mentioned, the target size can be determined based on a number of factors, such as an adjusted zoom or magnification level. The request can also be generated or triggered in response to a resize or zoom action, for example, which could be initiated by a user, an application, the client device, or another such source. The request can specify the target size, as well as potentially other information such as a content identifier, prior size information, user access criteria, and the like. In order to provide the desired image content without providing a full image, unless otherwise requested, the server receiving the request (or another appropriate system or service) can locate a copy of the image content as was originally sent to the client device, and that is of the same size. The server can then generate 808 a resized version of that image content at the target size, which will effectively match what is currently available on the client device. It should be mentioned, however, that for conversional algorithms that enforce dimensional restrictions it may not be possible to generate an image at the target size, such that a slightly larger image might be generated that can be resized on the client device, etc. The server can also obtain 810 a version of the image data at the target size, where that version can be generated using the high quality version (or any available version with sufficient size and/or resolution) and corresponds to what would be provided if the server were to provide an entirely new image at the target size.

The server can take the high quality version and apply a decoding scheme in order to generate or determine 812 a set of progressive encoding versions of the image. This can include, for example, an initial low quality version of the image and a set of versions generated from applying subsequent transformation passes on the low quality version according to a wavelet encoding scheme. The resized version can then be compared 814 against each of these progressive encoding versions to determine a corresponding progressive encoding version. The corresponding version could be the intermediate version that is the most similar to the resized version, such as may be based upon delta or size differences as discussed elsewhere herein, or could be an intermediate version that is close to, but less sharp than, the resized version, among other such options. If it is determined 816 that no intermediate version is sufficiently similar, then a full copy of the image content having the target size can be provided 820 instead of supplying encoding information starting from the resized image. If an intermediate version can be located that meets any similarity criteria, then the resized image can be substituted for the similar version and the subsequent encoding data can be provided 822 that can be applied to the resized image in order to generate an image similar to the final image of the target size. In some embodiments the selected intermediate image or subsequent encoding may differ between regions of the image, such as where more or less detail is needed or where certain types of objects are represented, such as photographic images or text. The encoding data can then be transmitted to the client device and caused 824 to be applied to the resized version of the original image as stored by the client device. In at least some embodiments the encoding data can also be encoded with an encoding or conversion algorithm, which may be the same as, or different from, the algorithm used to encode the image data. The progressive encoding can take the blurry or lower resolution version and sharpen that version until arriving at the final image. The application of the encoding data can result in a higher quality image at the target size than would have been obtained only through the resizing, but with less bandwidth and resource requirements than would have been needed to transmit an entirely new image. As mentioned, in some embodiments the client device can be caused 826 to apply one or more filters or perform one or more post-processing steps in order to attempt to improve the appearance of the image and/or remove any artifacts from the image resulting from the encoding being applied to a different version of the image. The post-processing can include, for example, smoothing or antialiasing, among other such options. As mentioned, in some embodiments the server can perform various post-processing steps and then instruct the client device to perform the most useful steps, while in other embodiments the client device might apply a default set of filters, etc.

Figure 9:
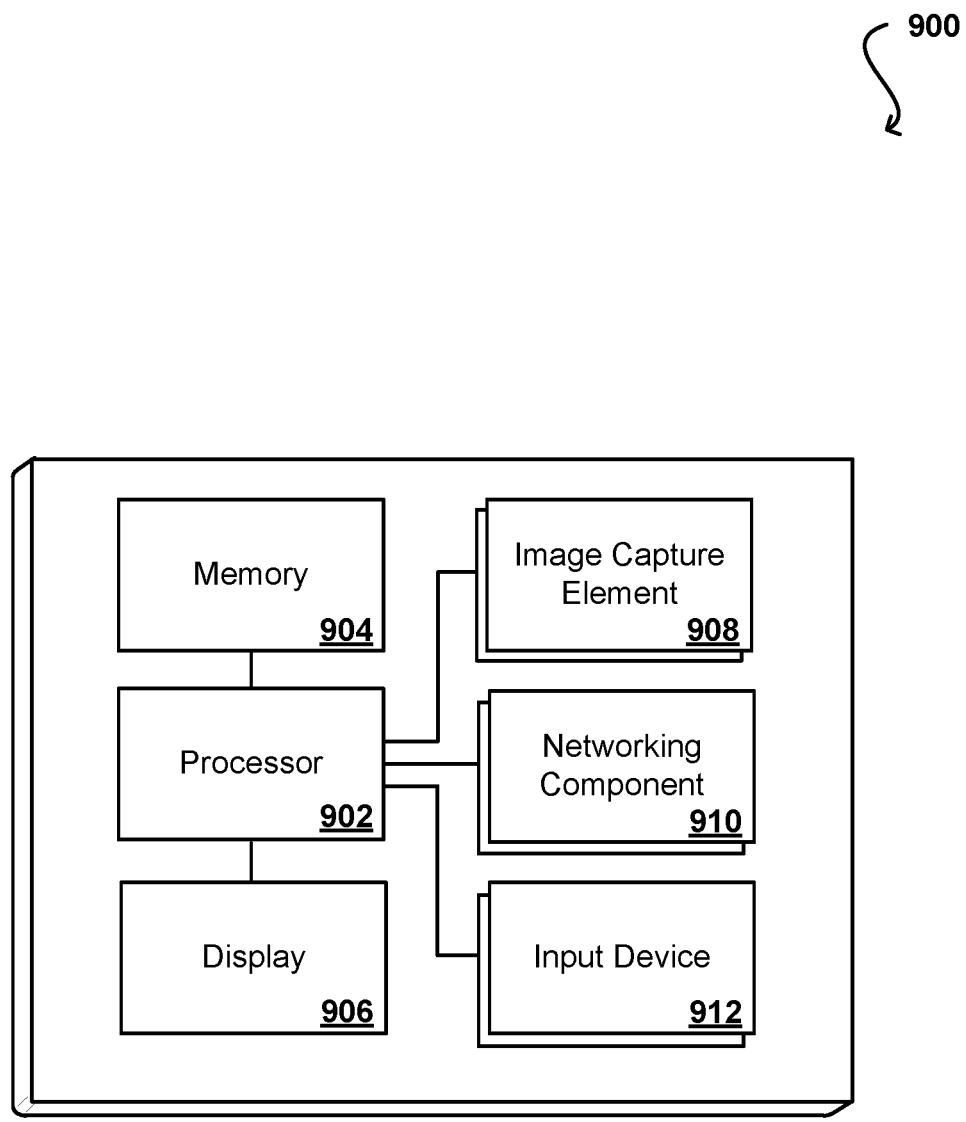
FIG. 9 illustrates components of an example computing device that can be used to implement aspects of various embodiments.

FIG. 9 illustrates a set of basic components of a computing device 900 that can be used to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device typically will include at least one type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as at least one image capture element positioned to determine a relative position of a viewer and at least one image capture element operable to image a user, people, or other viewable objects in the vicinity of the device. An image capture element can include any appropriate technology, such as a CCD image capture element having a sufficient resolution, focal range and viewable area, to capture an image of the user when the user is operating the device. Methods for capturing images or video using an image capture element with a computing device are well known in the art and will not be discussed herein in detail. It should be understood that image capture can be performed using a single image, multiple images, periodic imaging, continuous image capturing, image streaming, etc. The device can include at least one networking component 910 as well, and may include one or more components enabling communication across at least one network, such as a cellular network, Internet, intranet, extranet, local area network, Wi-Fi, and the like.

The device can include at least one motion and/or orientation determining element, such as an accelerometer, digital compass, electronic gyroscope, or inertial sensor, which can assist in determining movement or other changes in orientation of the device. The device can include at least one additional input device 912 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS.

The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices will also typically include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and other non-transitory media, such as, but not limited to, volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   providing an initial image having an initial size, the initial image including determined image content;
   determining that an action has occurred to cause the initial image to be displayed with a target size larger than the initial size;
   resizing a working copy of the initial image to the target size;
   obtaining a target image at the target size, the target image including the image content and being encoded using a progressive encoding scheme;
   comparing the resized working copy against a plurality of intermediate encoding image versions of the target image;
   determining an intermediate encoding image version of the plurality of intermediate encoding image versions of the target image that satisfies at least one similarity criterion with respect to the resized working copy; and
   providing, from the target image, encoding information transforming the determined intermediate encoding image version to a final image version of the target image, wherein the encoding information is applied to the initial image, resized to the target size, in order to generate a final image similar to the target image.

2. The computer-implemented method of claim 1, wherein a first amount of data corresponding to the encoding information is less than a second amount of data corresponding to the target image.

3. The computer-implemented method of claim 1, further comprising:
   generating the initial image and the target image using a high resolution image including the image content.

4. The computer-implemented method of claim 1, further comprising:
   causing at least one filter to be applied to the final image to reduce a presence of artifacts resulting from applying the encoding information to the initial image, resized to the target size.

5. The computer-implemented method of claim 4, wherein the at least one filter includes at least one of a de-ringing filter, a sharpening filter, an anti-aliasing filter, a text sub-pixel sharpening algorithm, or a tile edge filter.

6. The computer-implemented method of claim 4, further comprising:

testing a plurality of filters on the working copy at the target size after applying the encoding information to the working copy; and selecting the at least one filter to be applied based at least in part upon a similarity of the working copy, after applying the at least one filter, to the target image.

7. The computer-implemented method of claim 1, wherein the progressive encoding scheme includes a wavelet encoding algorithm.

8. The computer-implemented method of claim 1, further comprising:

receiving a request from a client device having received the initial image, the request specifying the target size corresponding to the action, the action being a resize action corresponding to the initial image as displayed on the client device; and providing the encoding information to the client device.

9. The computer-implemented method of claim 1, further comprising:

selecting the determined intermediate encoding image version using the at least one similarity criterion, transformation information between an initial encoding image version and the selected encoding image version being excluded from the encoding information.

10. The computer-implemented method of claim 1, wherein the determined intermediate encoding image version is not a most similar version to the resized working copy but corresponds to a lower quality version of the target image.

11. The computer-implemented method of claim 1, further comprising:

determining that at least one of a pixel value delta or a difference between the initial size and the target size satisfies at least one image modification criterion before determining the encoding information.

12. The computer-implemented method of claim 1, further comprising:

determining that a subsequent target size is greater than the initial size by more than a maximum size difference threshold; and providing a full new image at the subsequent target size and including the image content.

13. A system, comprising:

at least one processor; and memory including instructions that, when executed by the at least one processor, cause the system to:

provide an initial image having an initial size, the initial image including determined image content;

determine that an action has occurred to cause the initial image to be displayed with a target size larger than the initial size;

resize a working copy of the initial image to the target size;

obtain a target image at the target size, the target image including the image content and being encoded using a progressive encoding scheme;

compare the resized working copy against a plurality of intermediate encoding image versions of the target image;

determine an intermediate encoding image version of the plurality of intermediate encoding image versions of the target image that satisfies at least one similarity criterion with respect to the resized working copy; and provide, from the target image, encoding information enabling the determined intermediate encoding image version to transform to a final image version of the target image, wherein the encoding information is applied to the initial image, resized to the target size, in order to generate a final image similar to the target image.

14. The system of claim 13, wherein the instructions when executed further cause the system to:

cause at least one filter to be applied to the final image to reduce a presence of artifacts resulting from applying the encoding information to the initial image, resized to the target size.

15. The system of claim 14, wherein the instructions when executed further cause the system to:

test a plurality of filters on the working copy at the target size after applying the encoding information to the working copy; and select the at least one filter to be applied based at least in part upon a similarity of the working copy, after applying the at least one filter, to the target image.

16. The system of claim 13, wherein the instructions when executed further cause the system to:

receive a request from a client device having received the initial image, the request specifying the target size corresponding to the action, the action being a resize action corresponding to the initial image as displayed on the client device, wherein the encoding information is provided to the client device.

17. The system of claim 13, wherein the instructions when executed further cause the system to:

select the determined intermediate encoding image version using the at least one similarity criterion, transformation information between an initial encoding image version and the selected encoding image version being excluded from the encoding information, wherein the selected intermediate encoding image version is not a most similar version to the resized working copy but corresponds to a lower quality version of the target image.

18. A non-transitory computer-readable storage medium including instructions as a part of a content server system, the instructions when executed by at least one processor of a computing device causing the computing device to:

provide an initial image having an initial size, the initial image including determined image content;

determine that an action has occurred to cause the initial image to be displayed with a target size larger than the initial size;

resize a working copy of the initial image to the target size;

obtain a target image at the target size, the target image including the image content and being encoded using a progressive encoding scheme;

compare the resized working copy against a plurality of intermediate encoding image versions of the target image;

determine an intermediate encoding image version of the plurality of intermediate encoding image versions of the target image that satisfies at least one similarity criterion with respect to the resized working copy; and provide, from the target image, encoding information enabling the determined intermediate encoding image version to transform to a final image version of the target image, wherein the encoding information is applied to the initial image, resized to the target size, in order to generate a final image similar to the target image.

19. The non-transitory computer-readable storage medium of claim 18, wherein a first amount of data corresponding to the encoding information is less than a second amount of data corresponding to the target image.

20. The non-transitory computer-readable storage medium of claim 18, further comprising instructions when executed by at least one processor of the computing device causing the computing device to generate the initial image and the target image using a high resolution image including the determined image content.

\* \* \* \* \*